United States Patent [19]
Osborn et al.

[11] Patent Number: 5,765,860
[45] Date of Patent: Jun. 16, 1998

[54] APPARATUS FOR MOUNTING AN INFLATABLE VEHICLE OCCUPANT RESTRAINT MODULE TO A VEHICLE STEERING WHEEL

[75] Inventors: Scott K. Osborn, Rochester Hills, Mich.; Merle K. Ricks, Layton, Utah

[73] Assignee: Autoliv ASP, Inc., Ogden, Utah

[21] Appl. No.: 601,314

[22] Filed: Feb. 16, 1996

[51] Int. Cl.$^6$ ................................. B60R 21/16
[52] U.S. Cl. .................. 280/728.2; 200/61.54; 280/231; 411/509; 411/907
[58] Field of Search .............. 280/731, 728.1, 280/728.2, 728.3; 200/61.54, 61.55; 411/907, 908, 508, 509, 510

[56] References Cited

U.S. PATENT DOCUMENTS

| | | | |
|---|---|---|---|
| 1,974,160 | 9/1934 | Peirson | 411/509 |
| 4,176,428 | 12/1979 | Kimura | 411/509 |
| 5,283,404 | 2/1994 | Prescaro, Jr. | 200/61.55 |
| 5,316,423 | 5/1994 | Kin | 411/510 |
| 5,333,897 | 8/1994 | Landis et al. | 280/728.2 |
| 5,508,482 | 4/1996 | Martin et al. | 200/61.55 |

*Primary Examiner*—Eric D. Culbreth

[57] ABSTRACT

Apparatus for mounting a housing for an inflatable vehicle occupant restraint module to a vehicle steering wheel armature includes at least two snap-in fasteners for holding the housing in assembled relation with the armature. A resiliently compressible member is interposed intermediate the steering wheel armature and the housing to permit overtravel of the snap-in fasteners relative to the armature during assembly with the housing and to thereafter exert a force upon the housing to maintain a firm engagement of the snap-in fasteners with the housing and with the armature, and thereby maintain engagement between the housing and the armature.

10 Claims, 3 Drawing Sheets

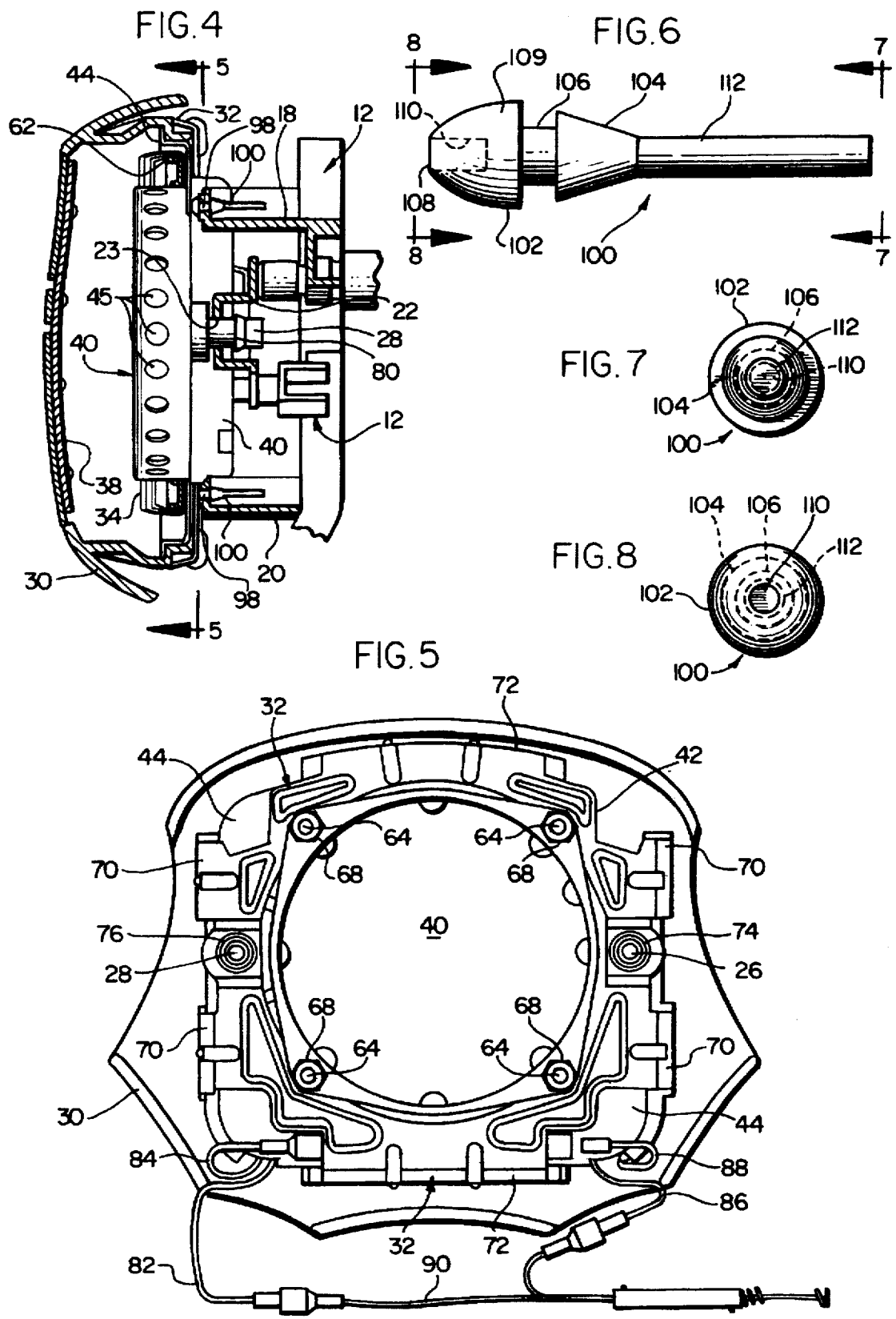

APPARATUS FOR MOUNTING AN INFLATABLE VEHICLE OCCUPANT RESTRAINT MODULE TO A VEHICLE STEERING WHEEL

BACKGROUND OF THE INVENTION

This application is directed generally to an inflatable vehicle occupant restraint or "air bag" module system. More particularly, the invention relates to apparatus for mounting such an air bag module to a vehicle steering wheel.

An inflatable vehicle occupant restraint, better known as an air bag, is commonly used to protect one or more occupants of a vehicle upon sudden vehicle deceleration, as may occur in a collision. The air bag for protecting the driver of the vehicle is typically provided as a module mounted in the vehicle steering wheel. Generally speaking, this module includes not only an inflatable cushion or air bag, but also an inflator module which, when activated, generates gas to inflate the cushion. Usually, the cushion and its inflator are mounted to a module housing which is in turn attached to the vehicle steering wheel. A cover portion of the module housing overlies both the inflator and the collapsed cushion.

Usually, a horn switch for sounding the vehicle horn is also mounted in the steering wheel assembly. Typically, the horn switch comprises a membrane-type switch which is mounted in a thin area intermediate the air bag module cover and the cushion. Thus, pressure applied to the cover will cause the membrane switch to be compressed between the cover and the cushion, closing or otherwise activating the membrane switch in order to sound the horn.

The membrane switch is electrically coupled with a positive potential, such as a vehicle battery potential, on one side or terminal thereof, and with electrical common, such as a vehicle frame portion, at the other side thereof. It has heretofore been the practice to extend a wire lead from the positive potential side of the switch through suitable openings provided in the module, whereupon this wire is connectorized or fitted with a connector for mating engagement with a connector extending from a source of suitable positive potential. It has heretofore been the practice to achieve connection of the common or ground terminal of the switch by means of a wire lead extending therefrom and coupled directly to a retainer plate for the air bag housing, which plate is commonly formed of a conductive metallic material and is attached to the metal housing by means of a metal retaining ring and a number of threaded metal studs and mating metal nuts, as will be described in detail hereinbelow.

Two "snap-in" fasteners normally are utilized to mount the module housing to the steering wheel armature, which is a metal vehicle part normally in conductive contact with the vehicle frame. However, it is believed that there may be a relatively small actual surface area of contact between these fasteners and the steering wheel armature. Moreover, contamination such as dirt or grease may also be present, thus adding contact resistance between the fastener and steering wheel armature. Thus, the contact between the fastener and the steering wheel armature may be such that the conductivity is not readily predictable.

As a related matter, the strength of the mechanical bond formed by the snap-in fastener between the module housing and the steering wheel armature is achieved by the amount of force applied during assembly. Typically, a pair of such snap-in fasteners extend through aligned and mating openings in the retainer plate to snappingly engage mating brackets attached to the wheel armature by screws or other fasteners. Compression of the module parts during assembly to the armature is relied upon to cause some amount of over-travel of the snap-in fastener. Thereafter, release of this compressive force is relied upon to provide sufficient forces to hold the fastener securely engaged with the module housing, and in turn hold the module housing firmly engaged with the steering wheel armature. However, there is room for further improvement in this arrangement and construction.

OBJECTS AND SUMMARY OF THE INVENTION

Accordingly, it is a general object of this invention to provide a novel and improved mounting of a housing of an air bag module to a steering wheel armature.

A further object is to provide such a mounting arrangement which further provides for improved engagement between the steering wheel armature and the module housing.

Yet a further object is to provide such a mounting arrangement which provides an improved and/or alternate electrical common or ground path from the horn switch common lead to the steering wheel armature.

Briefly, and in accordance with the foregoing objects, an apparatus for mounting a housing for an inflatable vehicle occupant restraint module to a vehicle steering wheel armature comprises at least two snap-in fasteners coupled with the steering wheel armature and with the housing for holding the housing in assembled relation with the armature; and a resiliently compressible member interposed intermediate said steering wheel armature and said housing to permit overtravel of said snap-in fasteners relative to said armature during assembly of said housing thereto and to thereafter exert a force upon said housing to maintain a firm engagement of said snap-in fasteners with said housing and with said armature and thereby maintain engagement between said housing and said armature.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description, taken in connection with the accompanying drawings in which like reference numerals identify like elements, and in which:

FIG. 4 is a sectional view taken generally along the line 4—4 of FIG. 2;

FIG. 5 is a bottom plan view of the module of FIG. 1 in assembled condition;

FIG. 6 is a side elevation of a conductive rubber bumper in accordance with the invention;

FIG. 7 is an end view of the bumper of FIG. 6; and

FIG. 8 is an end view of the bumper of FIG. 6, taken from the end opposite the view of FIG. 7.

DETAILED DESCRIPTION OF THE ILLUSTRATED EMBODIMENT

Figure 1:
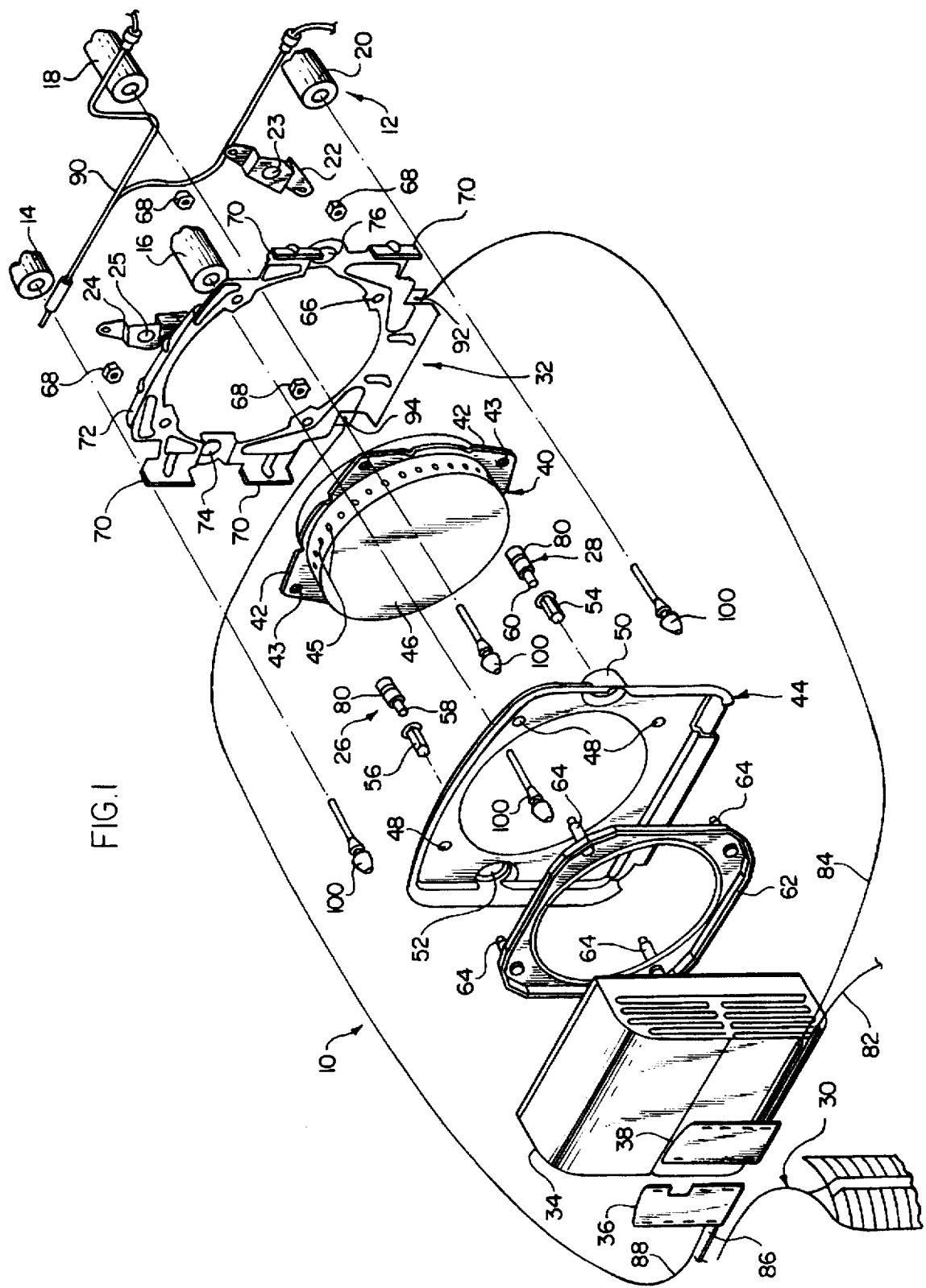
FIG. 1 is an exploded perspective view of an inflatable vehicle occupant restraint module in which the invention is employed, and a fragmentary portion of a steering wheel armature to which the module is to be mounted.
Figure 2:
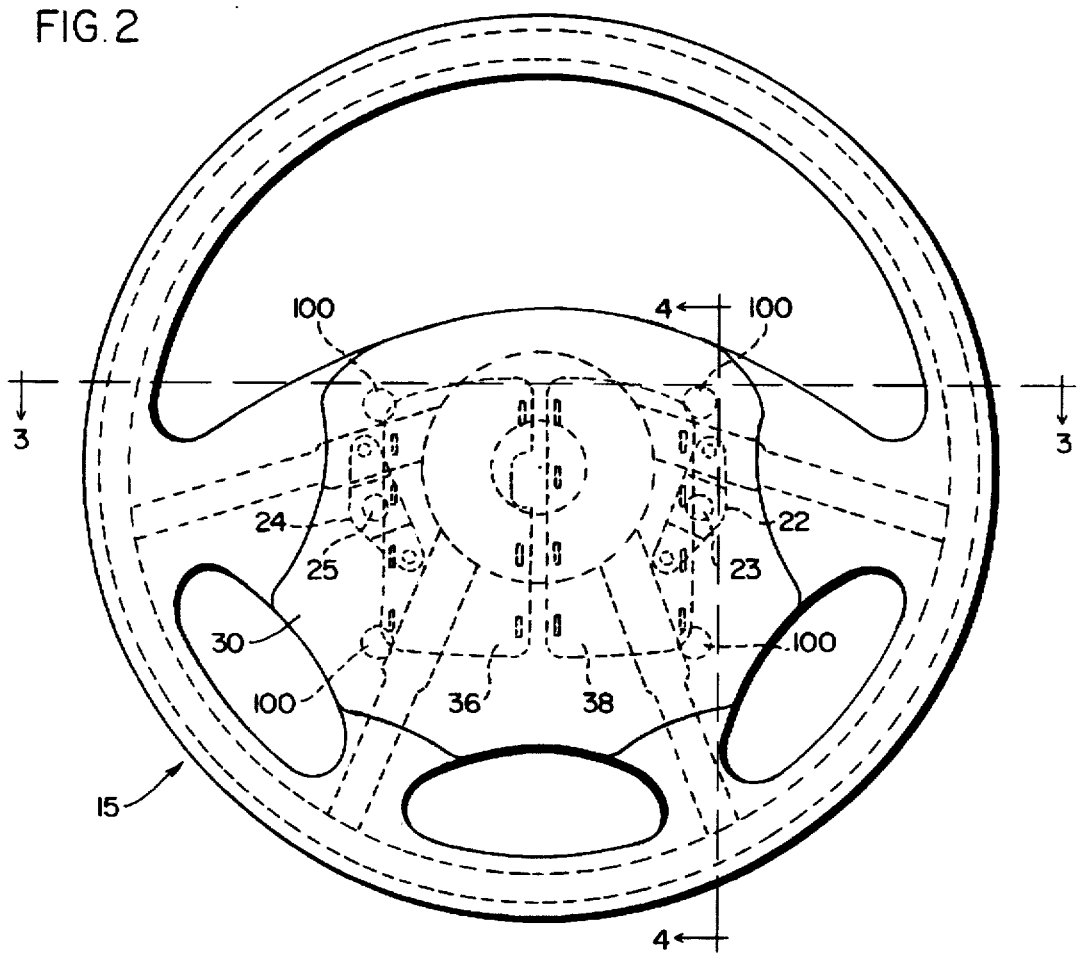
FIG. 2 is a top plan view of an automobile steering wheel to which the occupant restraint module of FIG. 1 has been assembled.
Figure 3:
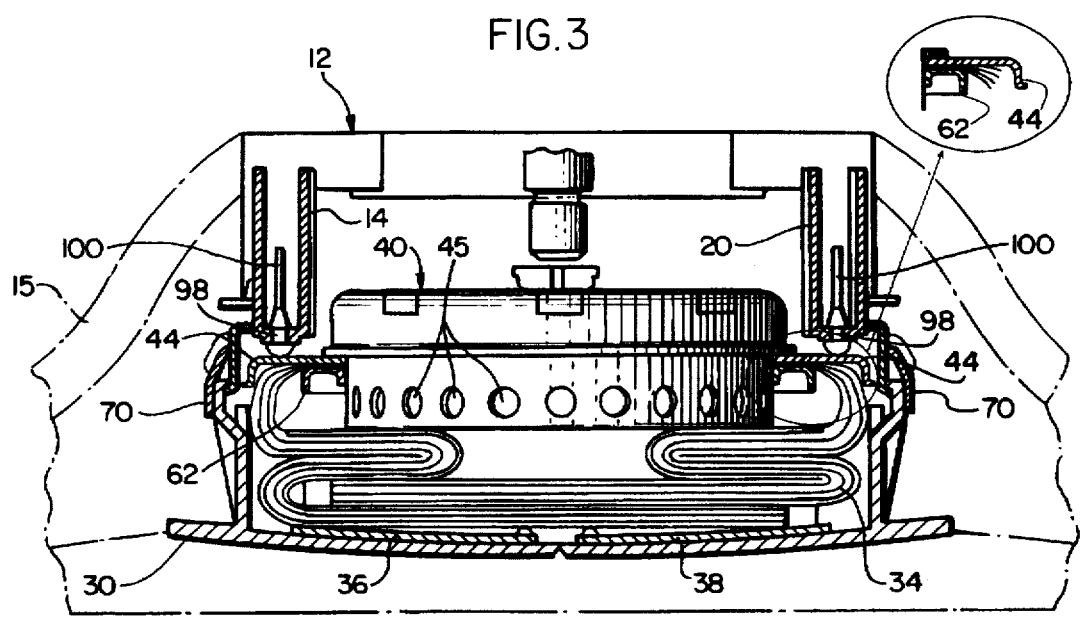
FIG. 3 is a sectional view taken generally along the line 3—3 of FIG. 2.

Referring now to the drawings, and initially to FIG. 1, there is shown in exploded perspective a passenger restraint module 10, together with elements for mounting this passenger restraint module 10 to an automobile wheel armature 12, which mounts a steering wheel 15 (see FIGS. 2 and 3). As to the wheel armature 12, FIG. 1 illustrates only a set of four projecting mounting members or elements 14, 16, 18 and 20 which form a part of the wheel armature, and a pair of mounting brackets 22, 24 which receive a pair of snap-on fasteners 26, 28 as will be described more fully hereinbelow.

Referring initially to the restraint module 10, it will be seen that it includes a cover assembly which has an outer or top cover member 30 and a frame-like cover retainer 32. Other parts of the assembly 10 are held intermediate this cover 30 and cover retainer 32. An inflatable cushion 34 is held in collapsed or folded condition immediately beneath the cover 30. However, at least one, and in the illustrated embodiment two, substantially identical horn switches 36, 38 are interposed between the cover 30 and inflatable cushion 34.

These horn switches are of a pressure-activated or membrane type, such that when the elements of FIG. 1 are in an assembled condition, downward pressure on the cover 30 will tend to compress the switches 36 and 38 between the cover 30 and the inflatable cushion 34, causing activation of one or both of the switches for sounding the vehicle horn. Referring also to FIG. 2, normally a small horn symbol (not shown) maybe superimposed upon the cover 30 at an appropriate position corresponding generally to the position of a respective one of the horn switches 36 and 38 therebelow.

An inflator module 40 has four outwardly projecting flanges 42, having through apertures 43 which generally define four corners of a square, for receiving suitable mounting hardware to be described presently. A frame-like housing 44 has an enlarged central through aperture for receiving a generally circular housing portion 46 of the inflator module 40 therethrough, and also four peripheral apertures 48 which align with the apertures 43 of the inflator module 40. The housing 44 further includes a pair of recessed apertures 50, 52 to either side thereof, each of which receives a rivet nut 54, 56, which is coupled therewith by upsetting an end portion thereof in the manner of a rivet. Each rivet nut has an internal thread for mating with an external thread 58, 60 of one of the snap-on fasteners 26, 28.

A retaining ring 62 is a generally annular member which mounts four projecting threaded studs 64 which align with the through apertures 48 of the housing 44 and with the through apertures 43 of the mounting flanges 42 of the inflator module 40, and project therethrough for assembly with these parts. Cooperatively, the cover retainer member 32 has four similar aligned apertures 66 through which studs 64 also project to receive mating lock nuts 68. Thus, upon assembly, the retaining ring and the lock nuts 68 secure the housing plate, inflator and cover retainer together in a sandwich-like assembly.

The cover retainer 32 has peripherally extending resilient flanges 70, 72 which snappingly engage cooperating portions of the cover 30 for retaining the same in place. The retaining ring also overlies edge portions of the inflatable cushion 34, as shown in FIGS. 3 and 4, for retaining the same in engagement with the inflator module 40, for assuring that gas generated by the inflator module exits through exit ports 45 thereof directly into the inflatable cushion 34 for causing the same to inflate. When this occurs, the expanding cushion will cause the cover 30 to disengage the resilient flanges 70, 72 of the cover retainer 32.

Referring also to FIGS. 4 and 5, the snap-in fasteners 26, 28 extend rearwardly through aligned through apertures 74, 76 provided in the retainer 32 to snappingly engage with through apertures 23, 25 provided in the brackets 22, 24. Each of the snap-on fasteners 26, 28 is formed with a peripheral, generally frusto-conical ring portion 80 which is designed to be pressed through the receiving aperture 23 or 25 in the bracket 22 or 24 but to prevent retraction of the fastener 26 or 28 in the opposite direction. This is done in order to retain the housing 44 in engagement with the brackets 22, 24, which are in turn secured to the wheel armature 12.

The horn switches 36, 38 have respective pairs of lead wires 82, 84 and 86, 88 which are to be coupled respectively with a suitable positive potential and a common or ground circuit. The respective lead wires 82 and 86 exit the assembly to be coupled to a wiring harness 90 which couples these two wires to a suitable positive potential such as a 12-volt battery. The respective common or ground leads 84, 88 extend within the assembly to couple to a pair of apertured tabs 92, 94 provided on the cover retainer 32. Thus, the ground path or common return for the horn switches 36, 38 is through the cover retainer 32 and the four studs 64 and their mating nuts 68 to the retaining ring 62 and thence to the housing 44. It will be remembered that the cover retainer 32, the housing 44, the retaining ring 62 and the flanges 42 of the inflator module 40 are all sandwiched together by action of the nuts 68 and studs 64. Preferably, all of these parts are constructed of metal materials. Accordingly, from the housing 44, the ground path to the steering wheel armature 12 is through the rivet nuts 54, 56 and the snap-on fasteners 58 and 60 and brackets 22 and 24, all of which are also constructed of conductive metal materials.

It will be noted from the foregoing that the electrical common path from the housing 44 to the steering wheel armature relies upon the snap-on fasteners 58, 60 and their engagement with the respective brackets 22, 24. The present invention improves upon this electrical contact, while at the same time offering an improvement upon the mechanical engagement established by the snap-on fasteners 58 and 60. The cover retainer 32, the inflator module 40, and the housing 44, which are held sandwiched together by the action of the studs 64 and nuts 68, are in turn held mounted to the armature 12 by the action of the snap-on fasteners 58 and 60.

To improve upon the path to common ground for the horn switches 36, 38 and also to improve the engagement of the snap-on fasteners with the steering wheel armature, the invention provides a plurality of bumper elements 100, which in the illustrated embodiment are four in number. Referring also to FIGS. 3 and 4, the four bumpers 100 are spaced generally at four corners of a rectangle or approximate square which is defined by the four extensions or projections 14, 16, 18 and 20 of the steering wheel armature 12. These four projections or extensions have apertures 98 which receive the bumpers 100 snappingly engaged therein.

Referring to FIGS. 6 through 8, each bumper 100 will be seen to comprise a body 102 having a tear drop-like shape. The body 102 has a frusto-conical lead-in surface 104, which is followed by a reduced diameter surface or generally annular recess or groove 106 in the body 102. To the other side of the groove, an increased diameter dome-like or dome-shaped head portion 109 is formed which terminates in a reduced diameter generally flat end surface 108. Importantly, the bumper 100 is formed from an electrically conductive rubber or rubber-like material.

Cooperatively, the apertures 98 in the steering wheel armature projections 14, 16, 18 and 20 are sized to be of slightly greater diameter than the reduced diameter groove 106 of the bumper 100. Thus, the bumper 100 may be snap fitted into these respective apertures 98 utilizing the frusto-conical lead-in surface 104 and taking advantage of the resilient compressibility of the material of the bumpers 100 to cause engagement and retention thereof with respect to the apertures 98 of the steering wheel armature projections. As best viewed in FIGS. 3 and 4, an end surface 108 of each bumper 100 is engaged with and compressed somewhat against a facing surface of the housing 44. In order to further define a desired degree of compressibility of the bumpers against the housing surface, an additional aperture or bore 110 may also be provided extending inwardly from the end surface 108 of each bumper 100.

Additionally, in the illustrated embodiment, each bumper 100 includes an elongated reduced diameter guide portion 112 extending outwardly from the lead-in surface 104 to facilitate initial location of and entry into the apertures 98.

It will be seen from the foregoing that the conductive rubber bumper 100 provide improved conductive contact between the steering wheel armature 12 and the housing 44, thus providing an improved or additional ground path or common path for the common leads 82, 86 of the horn switches 36 and 38. Moreover, the compressibility of the upper end portions of the bumper bodies 102 allows the snap-on fasteners to be over-advanced somewhat as they are engaged with the brackets 22 and 24, and provides some compressive force of engagement as the snap-on fasteners 26, 28 return to their normal engaged position relative to the brackets 22 and 24. That is, the bumpers 100, because of their resilient nature, provide a preload or force which tends to reduce any looseness, rattling or squeaking of the assembly in service. Thus, the bumpers 100 serve to provide improved performance in two respects, one electrical and one mechanical, with respect to the assembly of the automotive passenger restraint module 10 with the steering wheel of a vehicle.

While particular embodiments of the invention have been shown and described in detail, it will be obvious to those skilled in the art that changes and modifications of the present invention, in its various aspects, may be made without departing from the invention in its broader aspect, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. Apparatus for mounting a housing for an inflatable vehicle occupant restraint module to a vehicle steering wheel armature, said apparatus comprising: at least two snap-in fasteners for holding the housing in assembled relation with the armature; and a resiliently compressible member interposed intermediate said steering wheel armature and said housing to permit overtravel of said snap-in fasteners during assembly with said housing and to thereafter exert a force upon said housing to maintain a firm engagement of said snap-in fasteners with said housing and with said armature and thereby maintain engagement between said housing and said armature; wherein said resiliently compressible member is constructed of an electrically conductive elastomeric material so as to complete an electrically conductive path between said housing and said steering wheel armature.

2. Apparatus according to claim 1 wherein said resiliently compressible member is interposed intermediate said housing and a projecting portion of said steering wheel armature which extends said housing.

3. Apparatus according to claim 1 wherein said resiliently compressible member comprises a body having a frusto-conical lead-in surface followed by a reduced diameter surface and an increased diameter head at a side of said reduced diameter surface opposite said lead-in surface, for snap-in engagement with an aperture in said armature which has complementary dimensions, such that said module housing engages said head.

4. Apparatus according to claim 3 wherein said head defines an internal bore sized to obtain a desired compressibility and resiliency of said head for assembly of said housing therewith.

5. A combination of an inflatable vehicle occupant restraint module and apparatus for mounting said module to a steering wheel armature, said module comprising a housing and said mounting apparatus comprising a pair of snap-in fasteners coupled with the housing and aligned with mounting means for mounting said fasteners to said steering wheel armature; and a resiliently compressible member interposed intermediate said steering wheel armature and said housing to permit overtravel of said snap-in fasteners relative to said mounting means and to thereafter exert a force upon said housing to maintain a firm engagement of said snap-in fasteners relative to said housing and said armature, and thereby maintain engagement between said housing and said armature; wherein said resiliently compressible member is constructed of an electrically conductive elastomeric material so as to complete an electrically conductive path between said housing and said steering wheel armature.

6. The combination according to claim 5 and further including a cover portion and a cover retainer plate assembled with said housing, and wherein said module further includes an inflatable cushion mounted beneath said cover and a membrane horn switch interposed intermediate said inflatable cushion and said cover for activation in response to a compressive force applied thereto by and between said cover and said inflatable cushion; said horn switch having a lead electrically coupled to said cover retainer plate.

7. The combination according to claim 5 wherein said resiliently compressible member is interposed intermediate said housing and a projecting portion of said steering wheel armature which extends toward said housing.

8. The combination according to claim 5 wherein said resiliently compressible member comprises a body having a frusto-conical lead-in surface followed by a reduced diameter surface and an increased diameter head at a side of said reduced diameter surface opposite said lead-in surface, for snap-in engagement with an aperture in said armature which has complementary dimensions, such that said module housing engages said head.

9. Apparatus according to claim 8 wherein said head defines an internal bore sized to obtain a desired compressibility and resiliency of said head for assembly of said housing therewith.

10. A resiliently compressible member for use in an assembly for mounting a housing for an inflatable vehicle occupant restraint module to a vehicle steering wheel armature, comprising: a resiliently compressible, electrically conductive body having a frusto-conical lead-in surface followed by a reduced diameter surface and an increased diameter dome-shaped head at a side of said reduced diameter surface opposite said lead-in surface, said body for engagement between said armature and said module housing, such that said module housing engages said head.

* * * * *